United States Patent
Bharali et al.

(10) Patent No.: US 6,297,823 B1
(45) Date of Patent: *Oct. 2, 2001

(54) METHOD AND APPARATUS PROVIDING INSERTION OF INLAYS IN AN APPLICATION USER INTERFACE

(75) Inventors: Anupam Bharali, Santa Clara; George Skillman, San Jose, both of CA (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,115

(22) Filed: Apr. 3, 1998

(51) Int. Cl.⁷ .............................. G09G 5/00; G06F 13/00
(52) U.S. Cl. ...................... 345/340; 345/969; 345/342; 345/346
(58) Field of Search .................... 345/356, 346, 345/339, 332, 303, 329, 340, 969, 342; 707/501, 513; 709/302, 300, 203, 303

(56) References Cited

U.S. PATENT DOCUMENTS

| | | | | |
|---|---|---|---|---|
| 5,544,300 | * | 8/1996 | Skarbo | 345/342 |
| 5,572,648 | * | 11/1996 | Bibayan et al. | 345/358 |
| 5,572,649 | * | 11/1996 | Elliot | 345/340 |
| 5,638,505 | * | 6/1997 | Hemnway et al. | 345/340 |
| 5,706,437 | * | 1/1998 | Kirchner et al. | 709/203 |
| 5,801,701 | * | 9/1998 | Koppolu et al. | 345/352 |
| 5,802,530 | * | 9/1998 | Van Hoff | 707/513 |
| 5,937,064 | * | 8/1999 | Eick et al. | 380/9 |
| 5,944,830 | * | 8/1999 | Hong et al. | 703/324 |
| 5,950,008 | * | 9/1999 | Van Hoff | 709/201 |
| 5,956,032 | * | 9/1999 | Argiolas | 345/342 |
| 5,956,708 | * | 9/1999 | Dyko et al. | 707/3 |
| 6,002,397 | * | 12/1999 | Jaaskelainen et al. | 345/340 |
| 6,031,528 | * | 2/2000 | Langfahl | 345/348 |
| 6,052,730 | * | 4/2000 | Felciano et al. | 709/219 |
| 6,081,265 | * | 6/2000 | Nakayama et al. | 345/329 |
| 6,101,500 | * | 8/2000 | Lau | 707/103 |

OTHER PUBLICATIONS

Netscape Communicator, Netscape, pp. 33–45, Jan. 1996.*
Dick Oliver, et al., Netscape Unleased, 1996.*
Netscape Navigator 3.0, 1996.*
Microsoft Windows NT, 1996.*

* cited by examiner

Primary Examiner—John Cabeca
Assistant Examiner—Thomas Joseph
(74) Attorney, Agent, or Firm—Carr & Ferrell LLP

(57) ABSTRACT

A method providing for an improved user interface. In one aspect of the invention, a method is disclosed allowing an inlay from one application to have its parent application set to a second application. This allows, for example, an application which provides for network monitoring to have an inlay displayed in a web browser or the like allowing easier viewing of the inlay by the user when executing the web browser.

5 Claims, 18 Drawing Sheets

METHOD AND APPARATUS PROVIDING INSERTION OF INLAYS IN AN APPLICATION USER INTERFACE

BACKGROUND OF THE INVENTION

1. Field of the Invention

The present invention relates to the field of computer networks and more particularly to methods and apparatus for monitoring network connections in distributed networks such as the internet.

2. Related applications

This application claims benefit of the following co-pending U.S. Provisional Applications:
1) Method and Apparatus Providing for Automatically Restarting a Client Server Connection in a Distributed Network; Ser. No.: 60/043,621; Filed: Apr. 14, 1997;
2) Method and Apparatus Providing for Determining the Location of a Bottleneck Link in a Distributed Network; Ser. No.: 60/043,586; Filed: Apr. 14, 1997;
3) Method and Apparatus Providing for Determining Bottleneck Throughput in a Distributed Network; Ser. No.: 60/043,502; Filed: Apr. 14, 1997;
4) Method and Apparatus Providing for Determining Network Congestion in a Distributed Network; Ser. No.: 60/042,235; Filed: Apr. 14, 1997;
5) Method and Apparatus Providing for Determining a Service Provider Domain in a Distributed Network; Ser. No.: 60/043,503; Filed: Apr. 14, 1997;
6) Method and Apparatus Providing for Determining the Distance from a Client to a Server in a Distributed Network; Ser. No.: 60/043,515; Filed: Apr. 14, 1997;
7) Method and Apparatus Providing for Web Performance Visualization; Ser. No.: 60/043,691; Filed: Apr. 14, 1997; and
8) Method and Apparatus Providing for Inlays in an Application Program; Ser. No.: 60/043,524; Filed: April 14, 1997.

DESCRIPTION OF THE RELATED ART

Computer networks are becoming vastly complex. The average user is frustrated with increased performance problems, and not being able to determine the cause of such performance problems leaving the user to rely on finger pointing by the various vendors and others involved in the network communication. For example, if your web browser does not respond with the web page you requested for several minutes, is the problem with your computer? your local area network? your internet service provider? the internet backbone? The server you are trying to access?

Traditionally, Internet performance has been monitored largely by those who provision the Internet—the Internet Service Providers and the operators of the Internet backbone, such as MCI. These vendors, working under extremely competitive conditions, have tools available to them which, in high detail, monitor the activity of the equipment they control. But these tools, such as probes and sniffers, do not diagnose problems of the specific domain of the equipment owner. While they are excellent tools for monitoring the portion of the Internet under their control, they don't report on problems upstream or downstream. They are also too expensive to provide to multiple end user. And, these network management tools require that the various components in the network communicate in some known, and often proprietary fashion. Further, these tools generally require each of the components which is being monitored to execute some software (such as a network management agent) to allow monitoring of the device.

Other tools, such as "ping" and "traceroute," handy but cumbersome to use and very difficult to interpret. Webmasters of the Web sites typically monitor only the health of their own servers, not that of the Internet itself.

As a result, users with complaints either get an incomplete report of the contributing sources of their problem, or worse, they get the run-around from vendor to vendor. While this level of service is unthinkable elsewhere in the consumer's experience, because the Internet is new and technical, the Internet user feels both overwhelmed and helpless, a situation he or she wants to change.

In summary, unfortunately, distributed networks—such as the internet—do not allow sufficient control of what software agents are executing on each component in the network to allow full monitoring of the network.

Thus, what is needed is an improved method and apparatus for monitoring performance of computer networks.

More particularly, in distributed networks, there is a need to provide for monitoring of performance of computer networks without requiring devices such as servers, routers, etc. within the network to execute proprietary or special purpose software.

SUMMARY OF THE INVENTION

A method providing for insertion of an inlay in an application user interface is described. Initially, in the described method, a determination is made whether the required application interface exists (i.e., is executing on the computer system). For example, the method may insert the inlay in a browser and initially it is determined whether the browser is executing on the computer. Next, a validation step may occur to determine if the application user interface is supported. If the application user interface is executed and is supported, the application user interface is set as the parent of the inlay.

These and other aspects of the present invention will be described in greater detail in the detailed description and with reference to the drawings.

Figure 1:
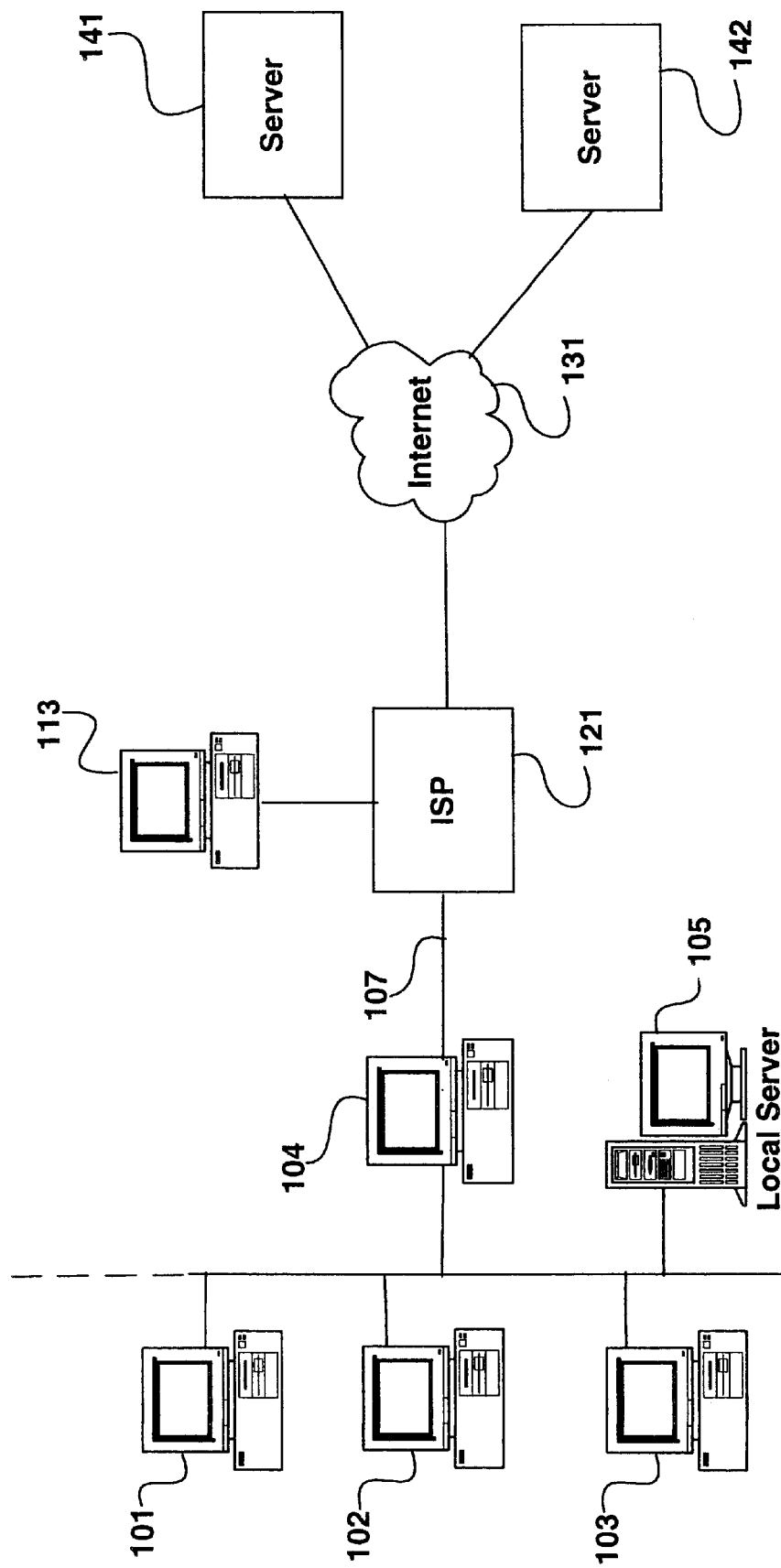
FIG. 1 illustrates an overall view of a network such as may be monitored by the present invention.
Figure 3:
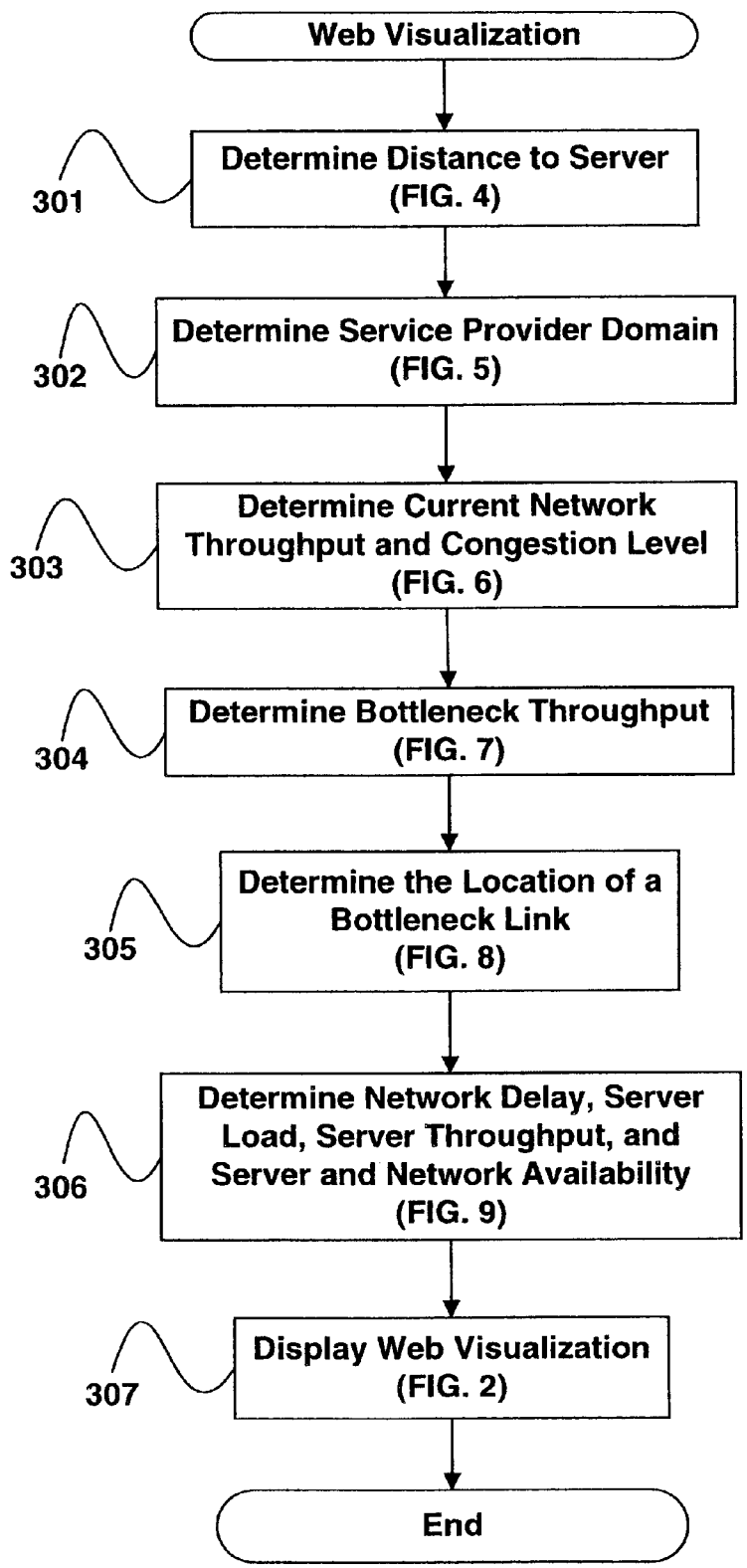
FIG. 3 illustrates an overall flow diagram showing monitoring of a network as may be implementing utilizing the present invention.

For ease of reference, it might be pointed out that reference numerals all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

I. Overview of a Network as May be Managed by the Present Invention (FIG. 1)

FIG. 1 illustrates an overall diagram of a network such as may utilize the present invention. The network comprises a local area network portion which includes data terminal equipment (DTE) 101, 102, 103, 104 and 105.

In the illustrated example, DTEs 101, 102 and 103 may be end-user computers executing a web browser, DTE 104 may be a router and DTE 105 may be a local server.

The router 104 is coupled over a connection 107 with an internet service provider (ISP) 121. The connection 107 may be over relatively traditional analog telephone lines using modems, or it may be over a relatively higher speed digital connection such as T1, ISDN, etc.

FIG. 1 also illustrates another DTE 113 which is connected to ISP 121. In the case of DTE 113, the connection is not through a local area network. Again, the connection between DTE 113 and ISP 121 may be over any of several analog or digital communication links.

The ISP 121 has a connection into the world wide internet backbone 131. Typically, this connection is a relatively high speed digital connection, but the connection could for example be a relatively lower speed analog connection without departure from the present invention.

There are any number of servers coupled with the internet 131. In the illustrated example, only two servers 141 and 142 are shown. These servers may, of course, be coupled through various analog and digital communication links.

A user, at for example computer 101, may want to request information from server 142. In this scenario, a computer program executing on computer 101 acts as a client to server 142. The computer program may typically be a web browser such as the Netscape Navigator™ web browser available from Netscape Communications Corporation of Mountain View, California or the Microsoft Internet Explorer™ available from Microsoft Corporation of Bellevue, Wash.

II. Visualization Interface as May be Utilized by the Present Invention (FIG. 2)

Figure 2A:
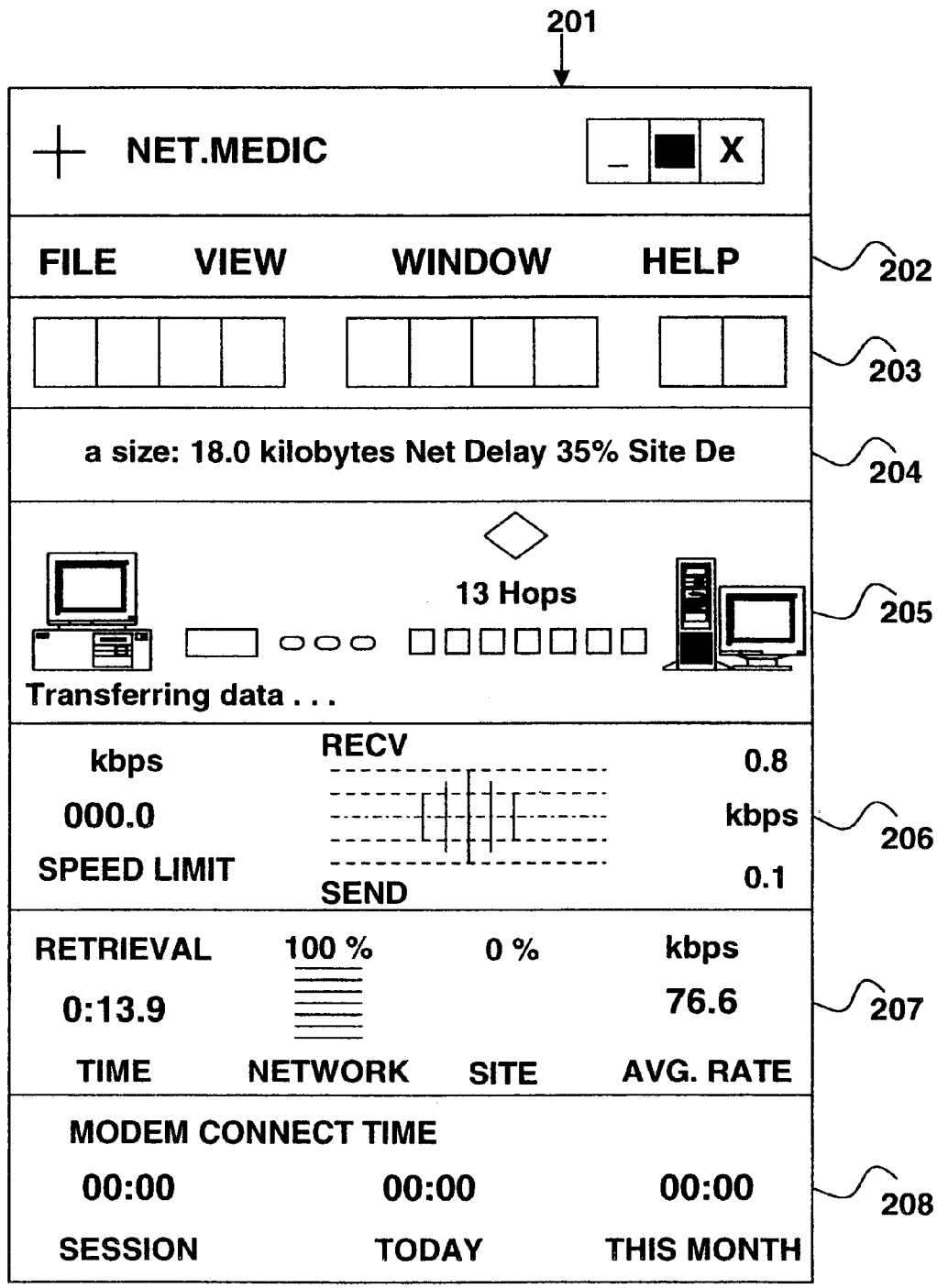
FIG. 2(A) illustrates a user interface such as may display the results of the monitoring process of the present invention.
Figure 2B:
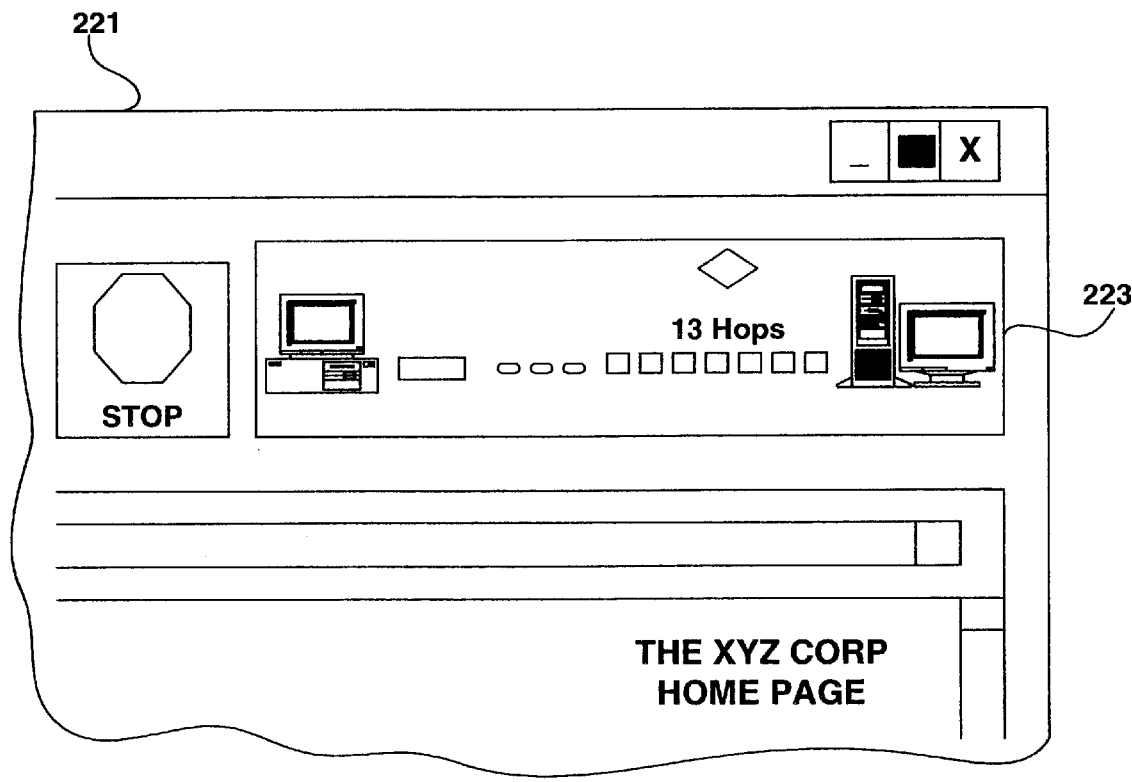
FIG. 2(B) illustrates an alternative user interface such as may display the results of the monitoring process of the present invention.

The present invention provides a visualization tool which allows the user to visualize the connection between the computer 101 and server 141. An embodiment of the visualization tool is illustrated by FIG. 2(A). A second embodiment is illustrated by FIG. 2(B).

The visualization tool provides an interface 201. The interface 201 includes relatively traditional tools such as FILE, VIEW, WINDOW, HELP, blocks 202 and 203 which will not be discussed here in detail. In addition, the visualization tool includes a textual scrolling display line 204 which scrolls textual network status information.

The visualization tool also provides a graphical depiction of the connection between computer 101 and server 141 in box 205. In box 205, computer 101 is illustrated as being 13 hops from server 141. The status of the communication between the two devices ("Transferring data") is noted in text and is also graphically noted by a "flying page" which moves across the graphical display from the server to the computer.

Box 206 illustrates the current "speed limit" or bottleneck speed of the connection between computer 101 and server 141 and the current speed of communication of data between the two devices in both the send (computer to server) and receive (server to computer) directions.

Box 207 illustrates the retrieval time for a "page" of data, and the average data communication rate.

Finally, box 208 provides the modem connect time for the particular session, for the day and for the month.

Methods used by the present invention for generation of data displayed on interface 201 will be described in greater detail below.

As one alternative to the embodiment of FIG. 2(A), FIG. 2(B) illustrates a inlay panel 223. One or more of the panels 204–208 of FIG 2(A) may be dropped into an application such as a web browser 221 and placed so that it is viewable while using the web browser 221. A method of the present invention for inserting inlay panels will be described in greater detail with reference to FIG. 12.

Figure 2C:
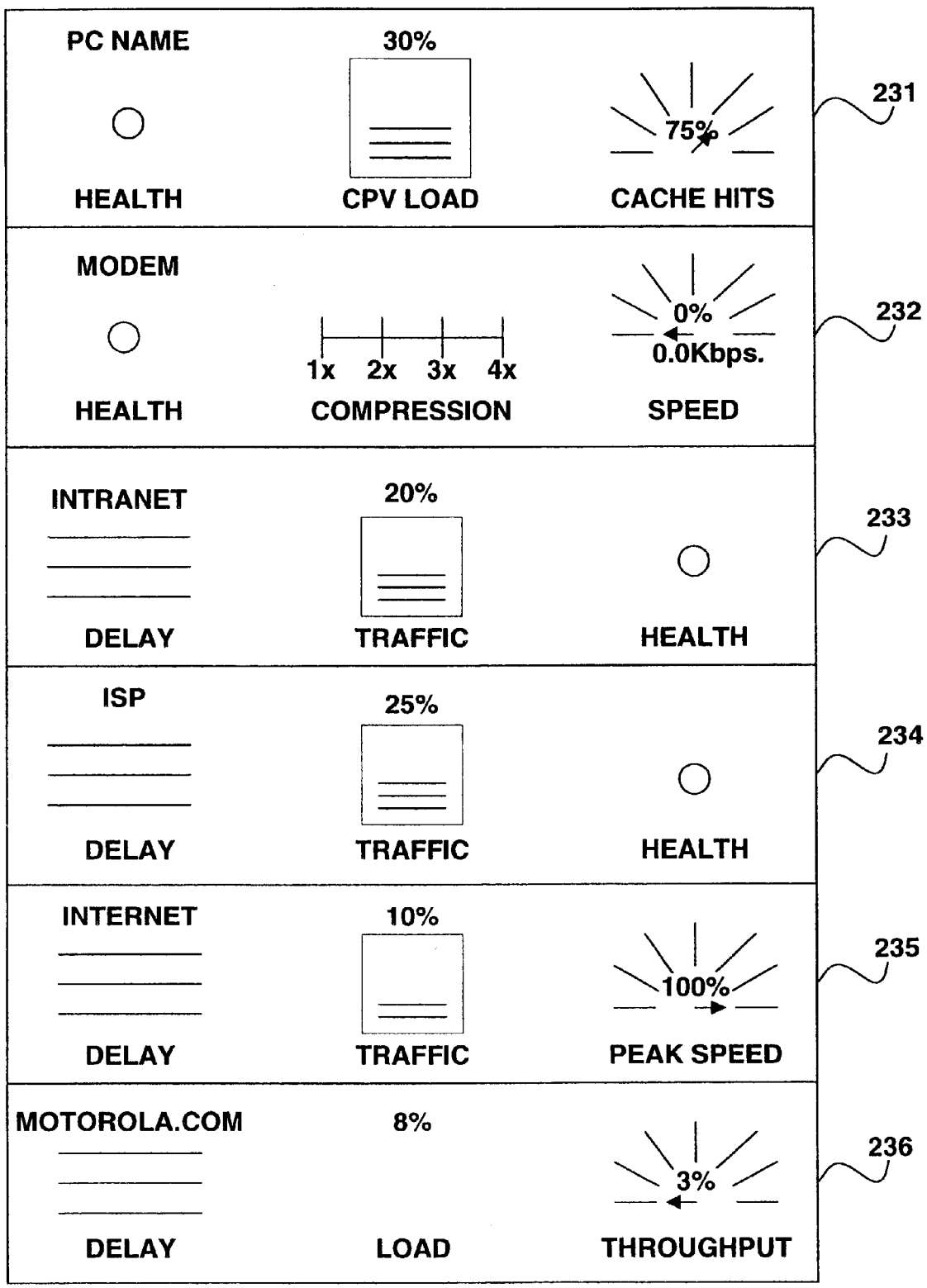
FIG. 2(C) illustrates additional panes as may be included in the user interface of FIG. 2(A).

In addition to the various panels discussed in connection with FIG. 2(A), other panels are provided by embodiments of the present invention. A set of panels is illustrated by FIG. 2(C) which illustrates panels showing client health information 231, modem health information 232, intranet health information 233, ISP health information 234, internet backbone health information 235 and server health information 236.

III. Overview of a Data Gathering Process as May be Utilized by the Present Invention (FIG. 3)

FIG. 3 is a flow diagram illustrating overall data gathering to provide for the web visualization tool of the present invention. As can be seen, the process involves a number of steps. In certain embodiments of the present invention, not all steps are utilized and not all described information is gathered. For example, in certain embodiments, it may not be required to determine the number of hops between the client and the server while in other embodiments, it may not be required to determine the server provider domain.

The overall process for providing visualization information comprises the steps of (1) determining the distance to the requested server (block 301) which will be described in greater detail in connection with FIG. 4; (2) determining the service provider domain (block 302) which will be described in greater detail in connection with FIG. 5; (3) determine the current level of network congestion (block 303) which will be described in greater detail in connection with FIG. 6; (4) determine the bottleneck throughput rate for the connection (block 304) which will be described in greater detail in connection with FIG. 7; (5) determine the location of the bottleneck link in the network (block 305) which will be described in greater detail in connection with FIG. 8; determine network delay, server load, server throughput, and network availability (block 306) which will be described in greater detail in connection with FIG. 9; and finally, display of the information (block 307) an embodiment of which was described in connection with FIG. 2.

IV. Determination of the Distance (Number of Hops) to a Server (FIG. 4)

As was illustrated by FIG. 2(A), the visualization interface 201 provides information to the user regarding the number of hops between the user's computer and the server being accessed. For example, in the illustration of FIG. 2(A), it is shown that there are 13 hops.

Figure 4:
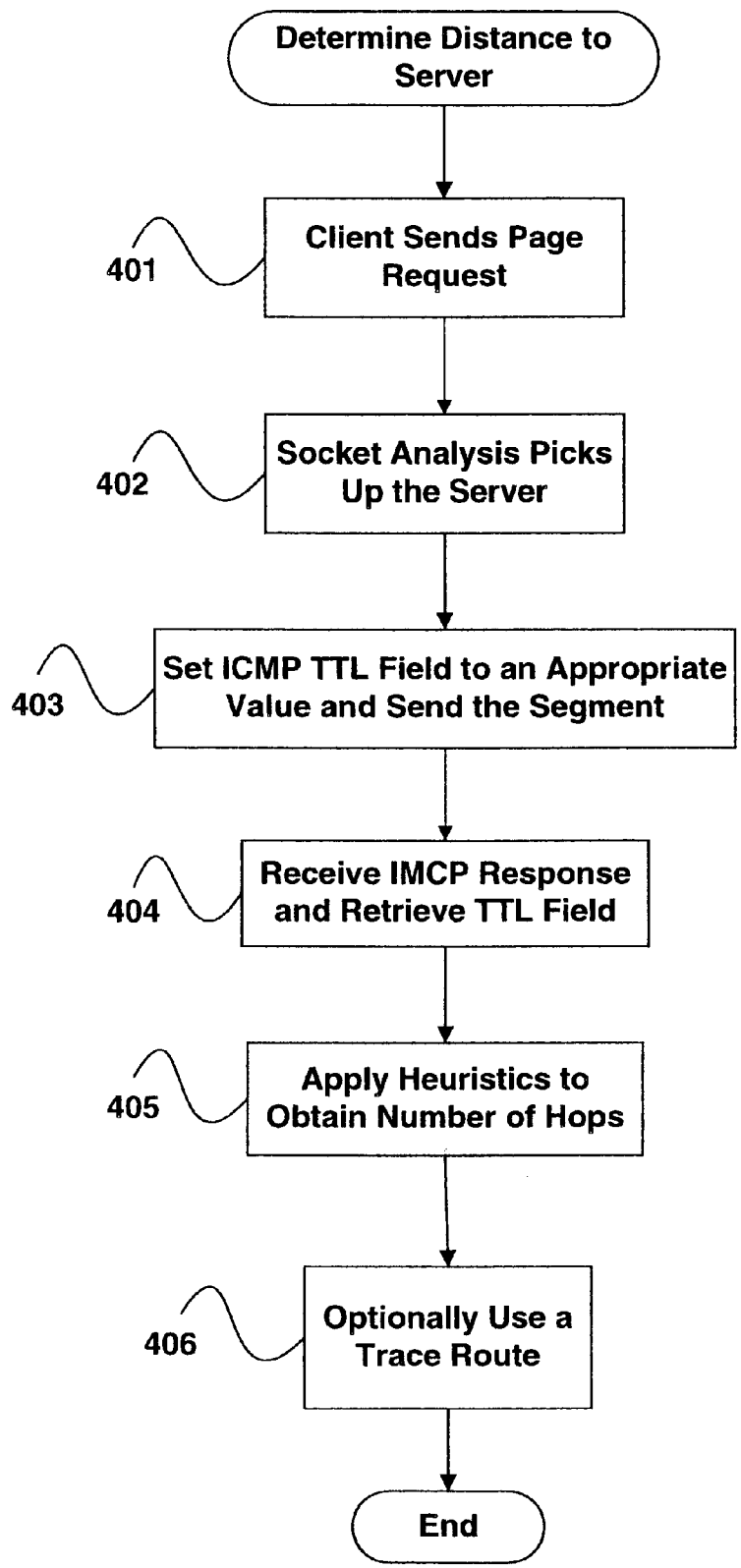
FIG. 4 illustrates a method of determining the distance from a client to a server as may be utilized by the present invention.

FIG. 4 provides a flow diagram illustrating a method used by the present invention for determining the number of hops. Initially, the client 101 sends a page request to a server using well-known techniques, block 401. A socket analyzer executing on the client intercepts the page request (this is better illustrated by FIG. 9(A)), block 402. Responsive to the page request, the socket analyzer transmits an internet control message protocol (ICMP) echo packet as will now be further described.

Use of the internet control message protocol (ICMP) is defined by RFC 792. A purpose of ICMP is to allow reporting of an error in processing a datagram between a source host (client) and destination host. ICMP is an integral part of the internet protocol (IP) and is required to be implemented by every IP module. Thus, as one aspect of the present invention, the described method takes advantage of transmission of ICMP packets thus assuring network wide support of the process without requirement to implement special purpose software on any device in the network in order to achieve the network monitoring described.

The format of ICMP messages is well known and described in RFC 792. When an IP module (such as server 141) receives an ICMP echo packet, it responds with an ICMP echo reply message.

One of the fields in the ICMP header is a time to live (TTL) field. The TTL field indicates the maximum number of hops over which this message should be forwarded and is generally used to avoid infinitely looping throughout the network by having each device in the network which forwards the message decrement the TTL counter until the TTL counter is zero at which point the packet is no longer forwarded.

When a device sends a ICMP echo reply message, the TTL field is set by the replying device to either a predetermined value or to the value in the TTL field when the ICMP echo packet is received.

In the present invention, the ICMP TTL field in the ICMP echo message is set to a predetermined value prior to transmission. The predetermined value used in one embodiment of the present invention is 180. However, in other embodiments, other values may be chosen. What is important is that the value was chosen based on experimental transmissions in which responses to various values was learned. As was stated above, in the ICMP echo reply message, the value of the TTL field is set based on the value of the TTL field in the received ICMP message. However, while most IP servers will base the TTL field set in the ICMP echo reply message on the received TTL field, it was observed that the particular algorithm for setting the TTL field varies from server to server (for example, a server running software from Microsoft Corporation may set the TTL value to a different value than a server running software from Netscape Communications).

Thus, the server behavior for various servers was determined in development of the present invention. Based on study of these algorithms, in the described embodiment it was determined to set the TTL value to 180.

In any event, the client transmits a ICMP echo message with the TTL field set to an appropriate value (e.g., 180), block 403, and in response an ICMP echo reply message is received from the server, block 404. The TTL field from the echo reply is examined and heuristics are applied to determine the number of hops, block 405. The heuristics are based on experimental data.

By way of example, assume it was observed through experiments that two types of servers were in operation on the network, one of which sets the TTL field to a predetermined value of 60 and the other which sets the TTL field to the value in the received message. In the described embodiment, the TTL field in the ICMP echo message transmitted by the client is set to a predetermined value of 180. The heuristic algorithm employed by the present invention assumes that the number of hops in each direction is a reasonable number (e.g., 30 or less). Note that since it is expected in the example that the number of one way hops is 30 or less, the round trip number of hops should be 60 or less. The number of hops is never less than 2 (one each direction). Thus, the number of hops is between 2 and 60. Thus, if the ICMP echo reply message is received by the client from the server and the TTL field is set to a relatively low number (e.g., 10), it is assumed that an error has occurred because the TTL field would be expected to be set in the range of either from 30 to 59 (for the first server type, assuming a preset value of 60 and assuming 1 to 30 hops are expected) or from 120 to 178 (for the second server type, assuming a round-trip number of hops of 2 to 60 and assuming the TTL was originally set by the client to be 180).

In applying the heuristics, if the returned TTL value is in the range of 30 to 58, the number of hops (one-way) is assumed to be ((60—RETURNED TTL VALUE)). If the returned TTL value is in the range of 120–178, the number of hops (one-way) is assumed to be ((180—RETURNED TTL VALUE)/2). Thus, if the RETURNED TTL VALUE was 152, the number of one way hops is assumed heuristically to be (180–152)/2=14 hops. If the RETURNED TTL VALUE was 42, the number of one way hops is assumed heuristically to be (60–42)=18 hops.

Thus, the present invention provides a relatively quick way to determine the hop count without need to resort to use of Traceroute messages. "Traceroute" is a network debugging utility that attempts to trace the path a packet takes through the network, i.e., its route. Use of the Traceroute is a well known technique which, among other uses, will determine the number of hops in a route. However, there is significant overhead associated with use of Traceroute. The present invention avoids use of Traceroute in many instances through the described use of ICMP echo packets and heuristics. Running traceroute on the address of the web server will list all of the connections on the internet that you must go through to reach the web server. Traceroute also prints statistics for round trip packet time for each connection it goes through. An example of the output of a Traceroute command is shown in Table I, below:

TABLE I

Traceroute Output
FROM www1.ixa.net TO vitalsigns.com 1 core1-eth1-0.sea.ixa.net (204.194.12.1) 2 ms 2 ms 2 ms
2 f8-0.c2.sea.ixa.net (199.242.16.2) 2 ms 2 ms 2 ms
3 bordercore1-hssi5-0-3.Seattle.mci.net (166.48.204.13) 8 ms 10 ms 7 ms
4 bordercore2-loopback.Bloomington.mci.net (166.48.176.1) 39 ms 40 ms 37 ms
5 internet-connection.Bloomington.mci.net (166.48.177.254) 39 ms 37 ms 39 ms
6 core1-fe4-0.MV.isi.net (206.251.1.1) 44 ms 37 ms 36 ms
7 core2-pos6-0.SV.isi.net (206.251.0.30) 40 ms 38 ms 37 ms
8 vitalsigns.com (206.251.6.192) 40 ms* 38 ms In certain circumstances, use of the ICMP echo packets and heuristics may yield results which are inconclusive as to the number of hops. For example, if the TTL in the ICMP echo reply does not fit within the described ranges (in the example), the number of hops is not determined heuristically by the present invention. In this case, a Traceroute command may be utilized, optionally, to determine the number of hops, block 406. For example, in the Traceroute of Table 1, eight hops were utilized to go from www1.ixa.net to www.vitalsigns.com.

Figure 5:
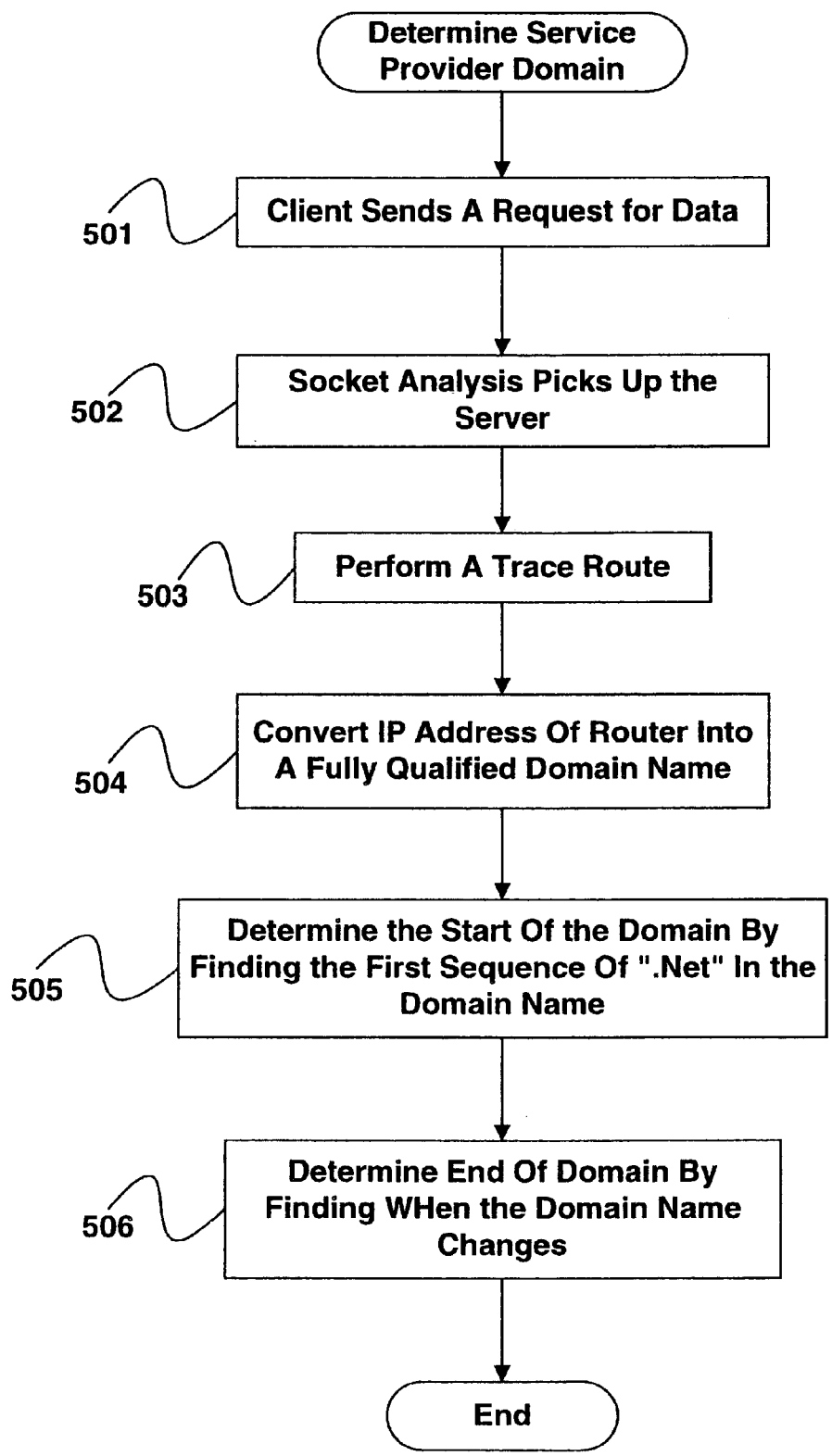
FIG. 5 illustrates a method of determining a service provider domain as may be utilized by the present invention.

V. Determination of a Service Provider Domain (FIG. 5)

It is useful to determine the domain for a service provider for a variety of purposes, including tracking historical information on regarding the number of times the service provider is accessed, the average response time of the service provider, etc. In addition, isolating problems to clear points of demarcation, such as the demarcation between an ISP and the internet backbone can be useful in assigning responsibility for correcting problems.

As one feature of the present invention, a method is provided for determining a service provider domain by providing demarcation between the various domains. The technique of the present invention for determining the domain of a service provider is termed a demarcation technique.

In the described method, the client 101 sends a page request to a server using well-known techniques, block 501. A socket analyzer executing on the client intercepts the page request (this is better illustrated by FIG. 9(A)), block 502. Responsive to the socket analyzer receiving the request for data, a Traceroute is performed, block 503. The Traceroute command returns a list of all connections on the internet which are traversed to reach the specified destination. As is illustrated by Table I, the IP addresses of the routers are converted into fully qualified domain names (e.g. 206.251.6.192 is vitalsigns.com), block 504.

In the present invention, the first sequence of ".net" in a domain name is recognized as the start of a domain, block 505. For example, bordercore1-hssi5-0-3.Seattle.mci.net is the start of the mci.net domain.

The end of the domain is determined by finding when the domain name changes (e.g. in Table I, changes from mci.net to isi.net), block 506. Thus, the end of the mci domain is at internet-connection.Bloomington.mci.net.

Figure 6:
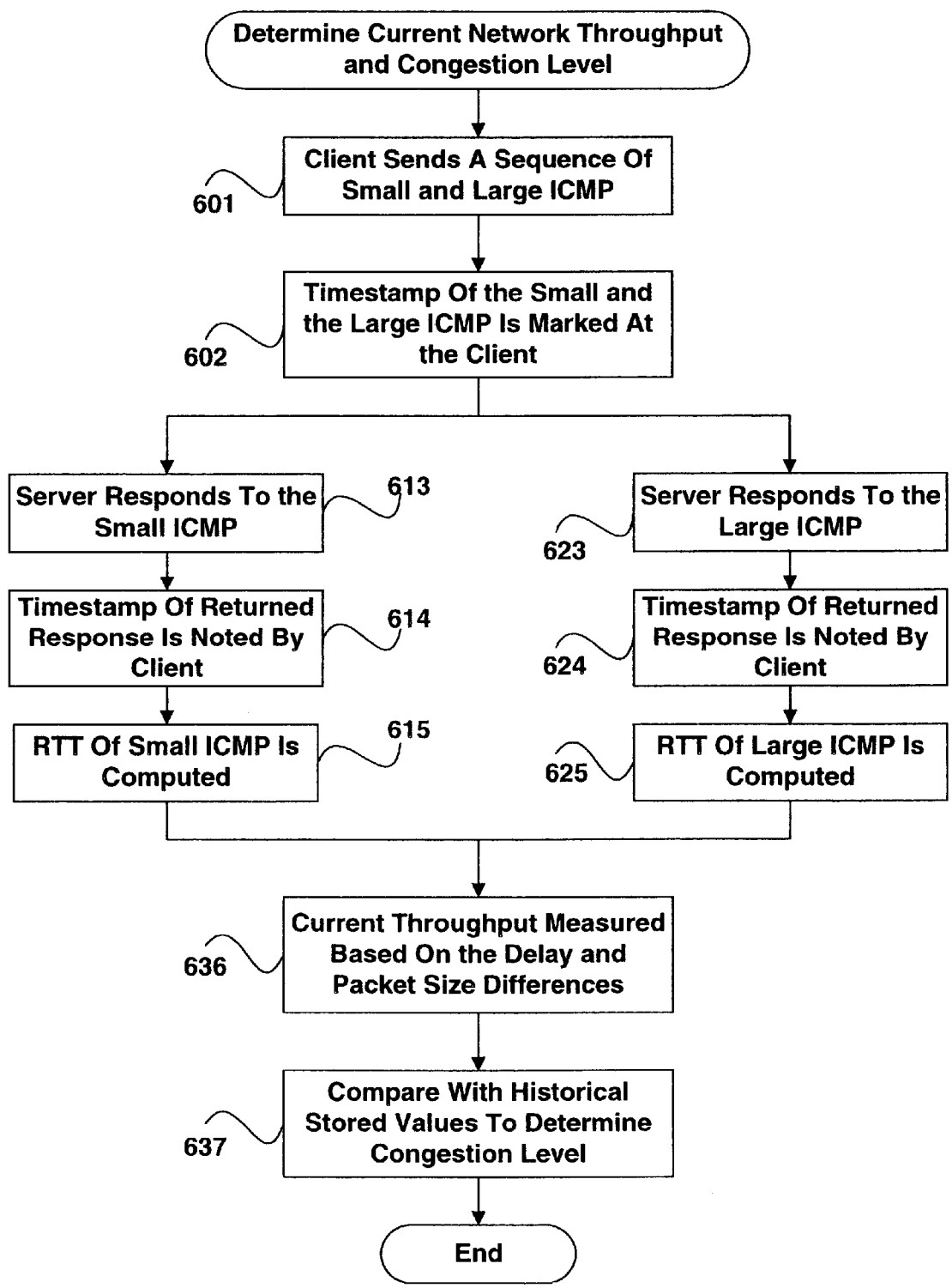
FIG. 6 illustrates a method for determining current network congestion such as may be utilized by the present invention.

VI. Determination of Current Network Throughput and Congestion Level (FIG. 6)

As was discussed in connection with FIG. 2, one measurement taken by a method of the present invention is of the network throughput and congestion level. A method for taking these measurements is better illustrated by FIG. 6.

Initially, the client sends both small and large ICMP echo messages, block 601. In one embodiment, the small messages are 100 bytes and the large messages are 700 bytes. In alternative embodiments, the packets sizes may be varied without departure from the present invention.

As one important feature of the invention, in the described method, the packet types are chosen to be non-compressible. Use of compressible packets may lead to unpredictable results and, for this reason, has not been chosen in the described embodiment.

The timestamp of transmission of both the small and large ICMP message is marked at the client, block 602. The server responds to both the small and large ICMP messages, block 613 and 623. The timestamp of the returned ICMP echo reply messages are noted by the client, blocks 614 and 624. Then, the round trip time (RTT) of each of the messages is computed, blocks 615 and 625.

For sake of simplicity and example, assume that the difference between the time when the small ICMP echo message was sent and the time an ICMP echo message is received was 10 seconds (clearly it should be shorter in real applications), then the transmission rate for the small packet is 10 bytes per second (100/10). If the RTT for the large ICMP echo message was 20 seconds, the transmission rate is 700/20 or 35 bytes per second.

In addition, although a sequence of any number of corresponding large and small packets may be sent in alternative embodiments, the number of packets required to be sent is limited. For example, in one embodiment, 2 sets of packets are sent. However, even a single packet would allow a calculation of the network throughput level. An increased number of sets of packets may provide a statistically more accurate result.

In any event, the network throughput can be computed based on the delay and packet size differences, block 636. In the example, to send an extra 600 bytes (700–100), it required an additional 10 seconds. Thus, the current network throughput is thus computed at a data transmission rate maximum of 60 bytes per second in the example.

One important feature of the present invention allows a computation of network congestion. Typically, network congestion has been computed by observing the number of packets which are transmitted on a particular network segment. The congestion level has been expressed essentially as a percentage of a theoretical maximum throughput. As has been stated, the present invention attempts to provide for network monitoring without requiring software modules to be executed on each device in the network, but rather by allowing computations to be made based on information available at and gathered at the client. Thus, one feature of the present invention allows for computation of network congestion by storing the congestion level as computed above, for accessing a particular server. The congestion level for a computed for a later access to the same server can be compared to the stored value. Based on this comparison, a congestion level is computed (i.e., the network is relatively congested or relatively uncongested dependent on whether the current network throughput is greater than stored historical throughput levels or less than stored historical throughput levels), block 637. The stored historical levels may, for example, store a minimum, maximum and average of the historical levels allowing improved comparisons with historical values.

VII. Determination of Bottleneck Throughput (FIG. 7)

Figure 8A:
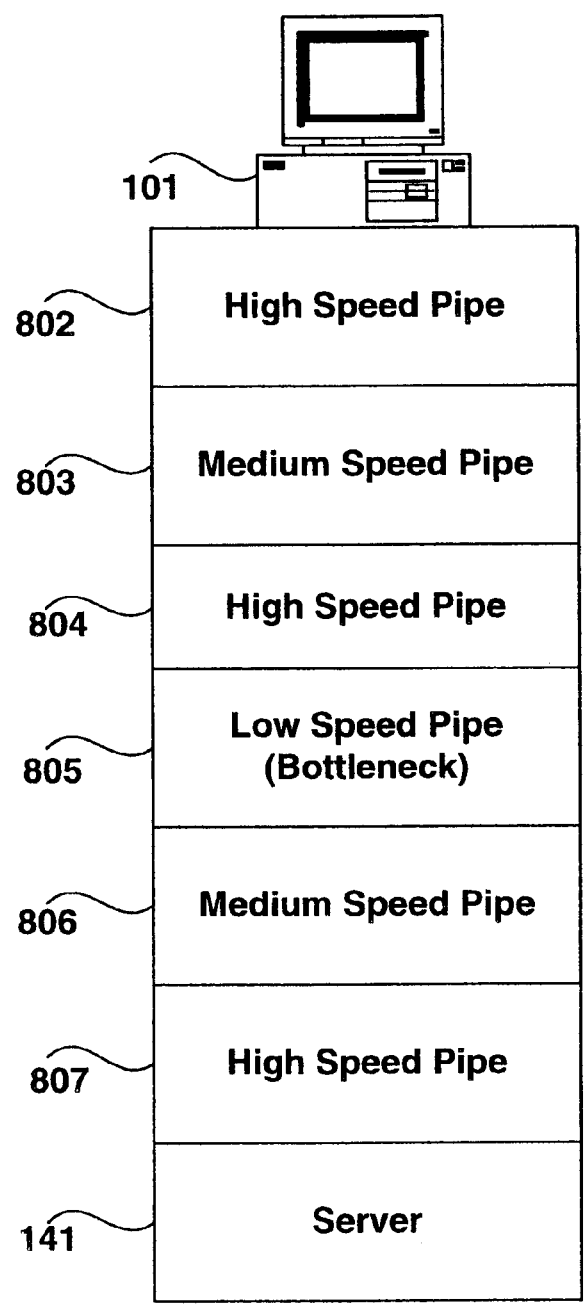
FIG. 8(A) is a diagram illustrated a bottleneck in a network such as may be monitored by the present invention.

It is useful to determine the maximum throughput for the connection between the client and server. The maximum throughput is based, at least in major part, on bottlenecks in the network. This is perhaps best illustrated by FIG. 8(A) which shows in an illustrative format a network connection between client 101 and server 141. FIG. 8(A) will be discussed in greater detail below. However, for now, it is worth noting that one portion of the connection includes a low speed communication pipe. This pipe may be, for example, a modem connection operating at 28.8 kbps or some similarly relatively low data transmission rate. The result is that there is a theoretical maximum data transmission rate of 28.8 kbps.

It may be worthwhile to explain the effect of this bottleneck in greater detail. Assume two packets are transmitted sequentially from the server 141 to the client 101. The packets traverse pipes 807 and 806 and arrive sequentially at pipe 805. The first packet is then transmitted through pipe 805 and, when it completes transmission through pipe 805, continues through pipe 804. The second packet then is transmitted through pipe 805. Eventually, the second packet completes transmission through pipe 805 and is then transmitted through pipe 804. However, it has been observed by the present invention that because of the difference in transmission speeds of the various pipes 802–807, an interpacket gap is introduced between the two packets even though they were originally transmitted sequentially by server 141. Although an interpacket gap is introduced by each of the pipes, the interpacket gap, as observed at the client, is representative of the transmission speed of the slowest pipe (i.e., the bottleneck). In other words, the interpacket gap after transmission through pipe 807 may be time T1, and after pipe 806 it may increase to time T2 (because pipe 806 is slower than pipe 807), and after pipe 805 it may increase to time T3 (because pipe 805 is slower than both pipes 806 and 807); however, all other things being equal, it will not again increase during transmission through pipes 804, 803 and 802 and will remain at time T3 because pipes 804, 803 and 802 are all relatively higher speed than pipe 805. Thus, the interpacket gap observed at client 101 is representative of the bandwidth or bottleneck speed of pipe 805 and the packet size.

The present invention discloses a method for determining the bottleneck speed by observing at a client the interpacket gaps between two packets which are transmitted sequentially by a server.

Figure 7A:
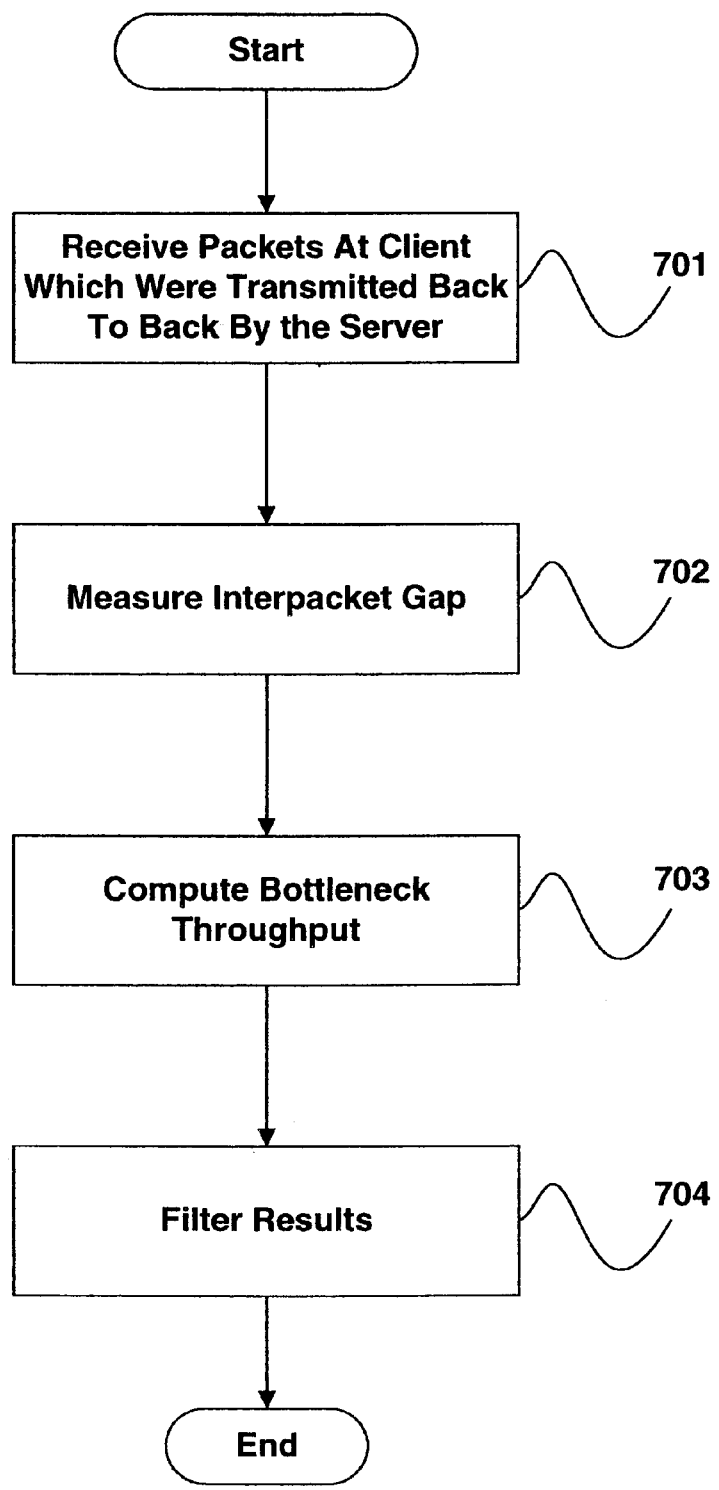
FIGS. 7(A) and 7(B) illustrates a method for determining bottleneck throughput such as may be utilized by the present invention.

FIG. 7(A) illustrates an overall method of determining the bottleneck throughput of a network connection. Initially, packets are received at a client 101 which were transmitted by the server 141 back-to-back, block 701. The client may recognize that packets were transmitted back-to-back any of a number of ways. For example, initially the client may determine that the packets sequence numbers are consecutive. However, consecutive sequence numbers do not necessarily indicate the packets were sent back to back because, although sequential, there may have been delay introduced by the server before transmission of the second packet. The present invention has observed that packets transmitted during the TCP slow start phase and the TCP Congestion Avoidance Condition represent conditions under which servers transmit packets back-to-back.

The TCP slow start phase is described in greater detail in Jacobson, V., Congestion Avoidance Control, presented at SIGCOMM '88 (Stanford, Calif., August, 1988 revised November, 1988) hereinafter Jacobson.

The TCP Congestion Avoidance Condition occurs when the sending side of TCP has detected that there was a packet loss. The system then performs the sequence of steps towards avoiding congestion as described in Jacobson. First, when the sending side detects congestion, it is required to halve its congestion window. After this condition is reached, in response to each segment acknowledgment received by the sender, the sender increases its congestion window. During this stage, the sender may send several segments back-to-back. This behavior is similar to the TCP slow start in that back-to-back packets are transmitted, but occurs after each time the congestion window is halved.

It is noted that both of the TCP slow start phase and the TCP Congestion Avoidance Condition represent conditions where the TCP pipe is empty in both directions.

In addition to requiring back-to-back transmission of packets, in the described embodiment, measurements of bottleneck bandwidth are only carried out if both packets of the packet pair are 1500 bytes long.

If back-to-back packets are detected, the client measures the interpacket gap between the packets, block 702 and computes the bottleneck throughput as; block 703, as:

Bottleneck throughput=
 length of second packet * 8/interpacket gap
 where the length is in bytes (and multiplied by 8 to obtain bits).

The present invention implements a filter to determine when the bottleneck throughput is excessive to allow for exception reporting, block 704.

Figure 7B:
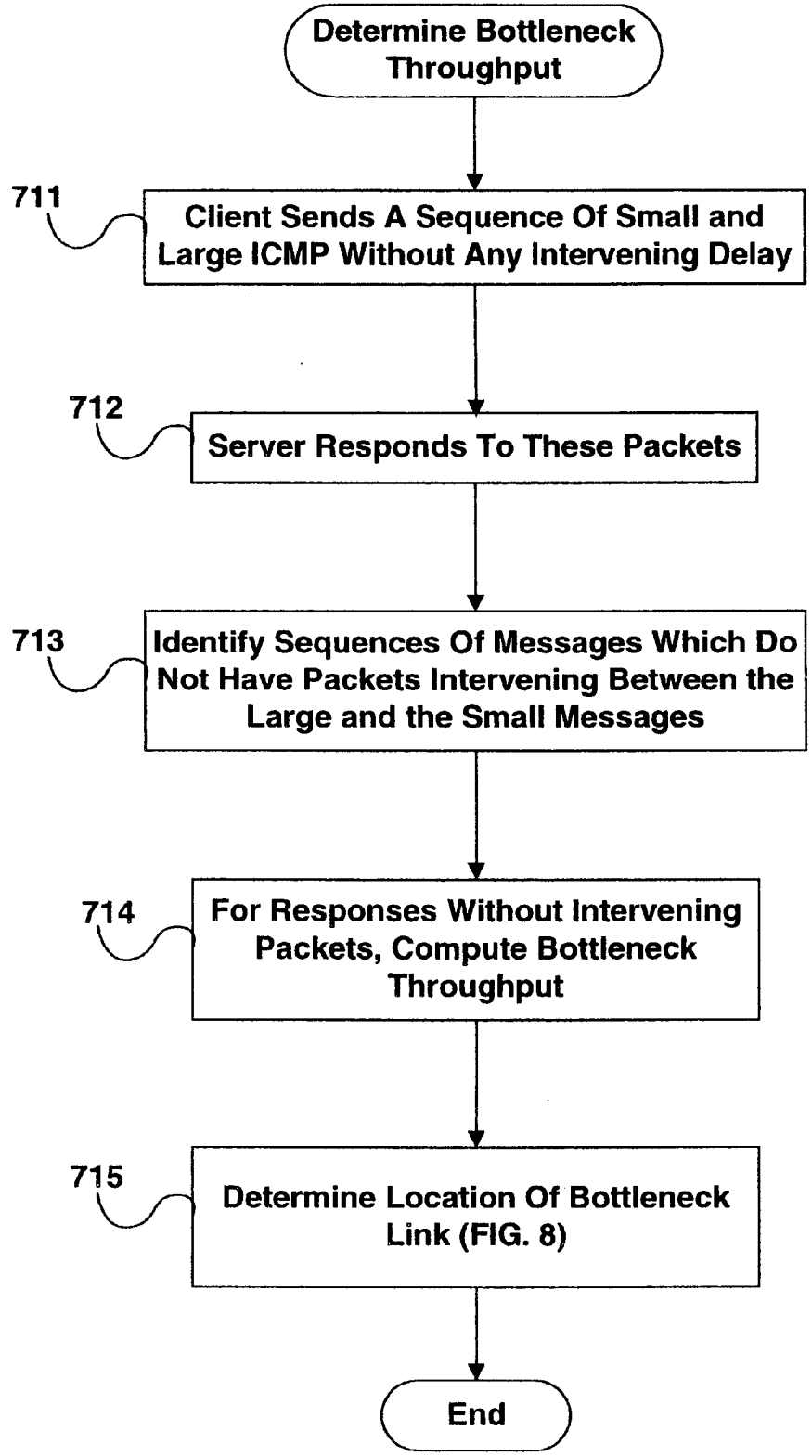

FIG. 7(B) illustrates an alternative method of determining bottleneck throughput. A client transmits a sequence of small and large ICMP echo packets without intervening delay between the each small and large packet pair, block 711. The server responds with ICMP echo reply packets, block 712. The client examines the returned ICMP echo reply packets to determine sequences which did not have intervening delay between the returned small and large packets, block 713. Packet sequences which are determined to have intervening delay between a small and large packet pair are not used in the bottleneck throughput calculation because it is assumed that the delay is caused by network congestion unrelated to the bottleneck. The throughput is then calculated, as was discussed above in connection with FIG. 6, for packets pairs which did not have intervening delay in the returned ICMP echo reply packets, block 714.

As will be discussed in greater detail in FIG. 8, the location of the bottleneck may then be determined, block 715.

VIII. Determination of Bottleneck Location (FIG. 8)

Once the bottleneck speed is known, it is useful to locate the bottleneck. FIG. 8(A) illustrates client 101 coupled with a high speed pipe 802. The high speed pipe 802 may be for example a T1 line. The high speed pipe is shown as coupled with a medium speed pipe 803 such as an ISDN line. The medium speed pipe 803 is coupled with another high speed pipe 804 which in turn is coupled with a low speed pipe 805. The low speed pipe 805 was discussed earlier as the bottleneck pipe in the communication path. The low speed pipe 805 is coupled with another medium speed pipe 806, which in turn is coupled to the high speed pipe 807 and finally to server 141. Thus, as can be seen, the communication path is only as fast as its slowest link and, in the exemplary case, the slowest link is represented by low speed pipe 805.

Figure 8B:
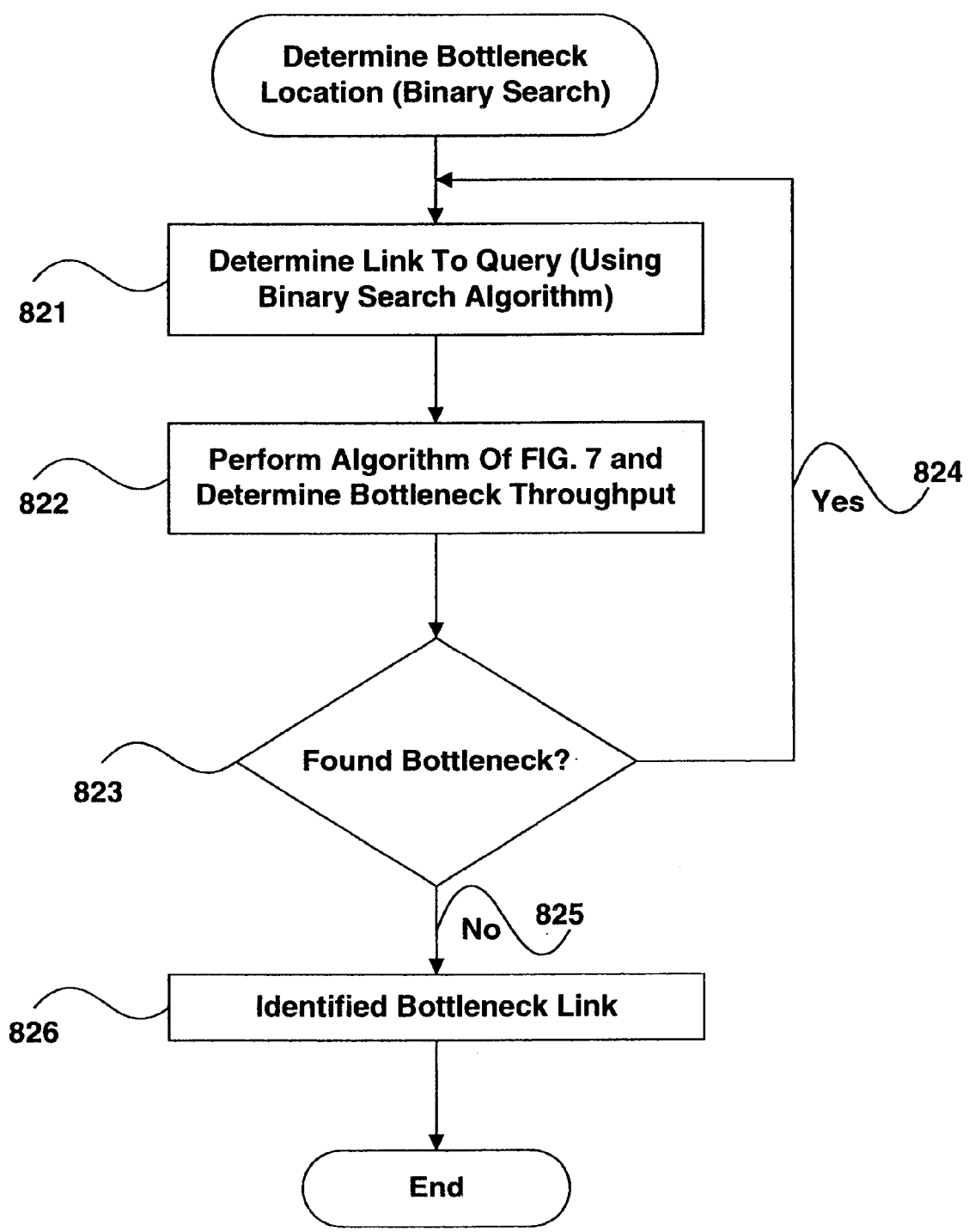
FIG. 8(B) is a flow diagram illustrating a method of utilizing a binary search to locate a bottleneck in a network.

FIG. 8(B) illustrates a method for locating the bottleneck. In the described embodiment, a binary search is utilized to find the bottleneck. In particular, a determination is made of a link to query preferably using a binary search type algorithm, block 821. Therefore, since there are six pipes 802–807, using a binary search type algorithm, either pipe 804 or 805 may be chosen (both are equally at the middle of the six pipes). Assume that 804 is chosen. The algorithm of FIG. 7 is then executed to determine the bottleneck throughput of the path from client 101 through pipes 802 and 803 to pipe 804, block 822. The bottleneck throughput of this path is then compared with the bottleneck throughput of the entire path, block 823. In this example, the bottleneck throughput of this path is greater than the bottleneck throughput of the entire path and, therefore, it can be assumed that the bottleneck pipe lies beyond pipe 804. Branch 824 is taken and this time pipe 806 is selected. In this case, the bottleneck throughput of the path is equal to the throughput of the entire path. Therefore, it can be assumed that the bottleneck is before this pipe. Next, pipe 805 is chosen as the link to query, block 821. The bottleneck throughput of this path is greater than the throughput of the entire path. Since it is known that that pipe 806 is beyond the bottleneck, it can now be assumed that pipe 805 is the cause of the bottleneck.

IX. Determination of Retrieval Time (FIG. 9)

Figure 9A:
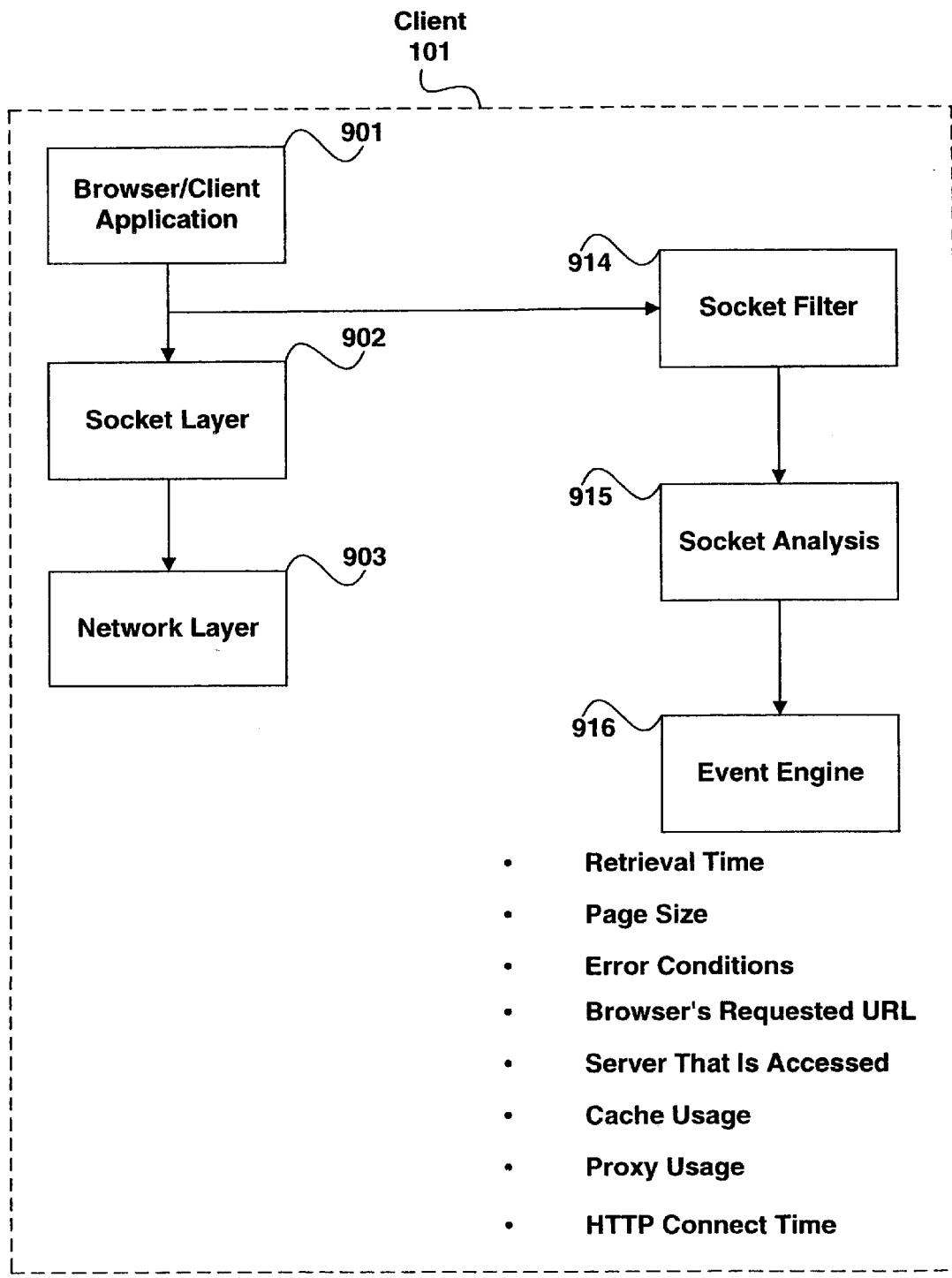
FIG. 9(A) is an overall illustration of a client utilizing an event engine such as may be utilized in the present invention.

FIG. 9(A) illustrates an overall view of the process of monitoring a network. FIG. 9(A) has been referred to several times as illustrating the inclusion of a socket filter 914 in the communication process. The socket filter 914 intercepts communications from a browser or other application 901 intended to go to the network through a socket layer program 902 and a network layer program 903. The browser 901, socket layer program 902 and network layer program 903 are well known and will not be described in greater detail here. The socket filter intercepts communications and provides those communications to a socket analysis program 915 and finally to event engine 916. The event engine is responsible for providing page retrieval times (as will be discussed in greater detail in FIG. 9(B), page size information, noting error conditions, recording requested URL's, recording which servers are accessed, recording cache usage information, recording proxy usage information, and recording HTTP connect time.

Figure 9B:
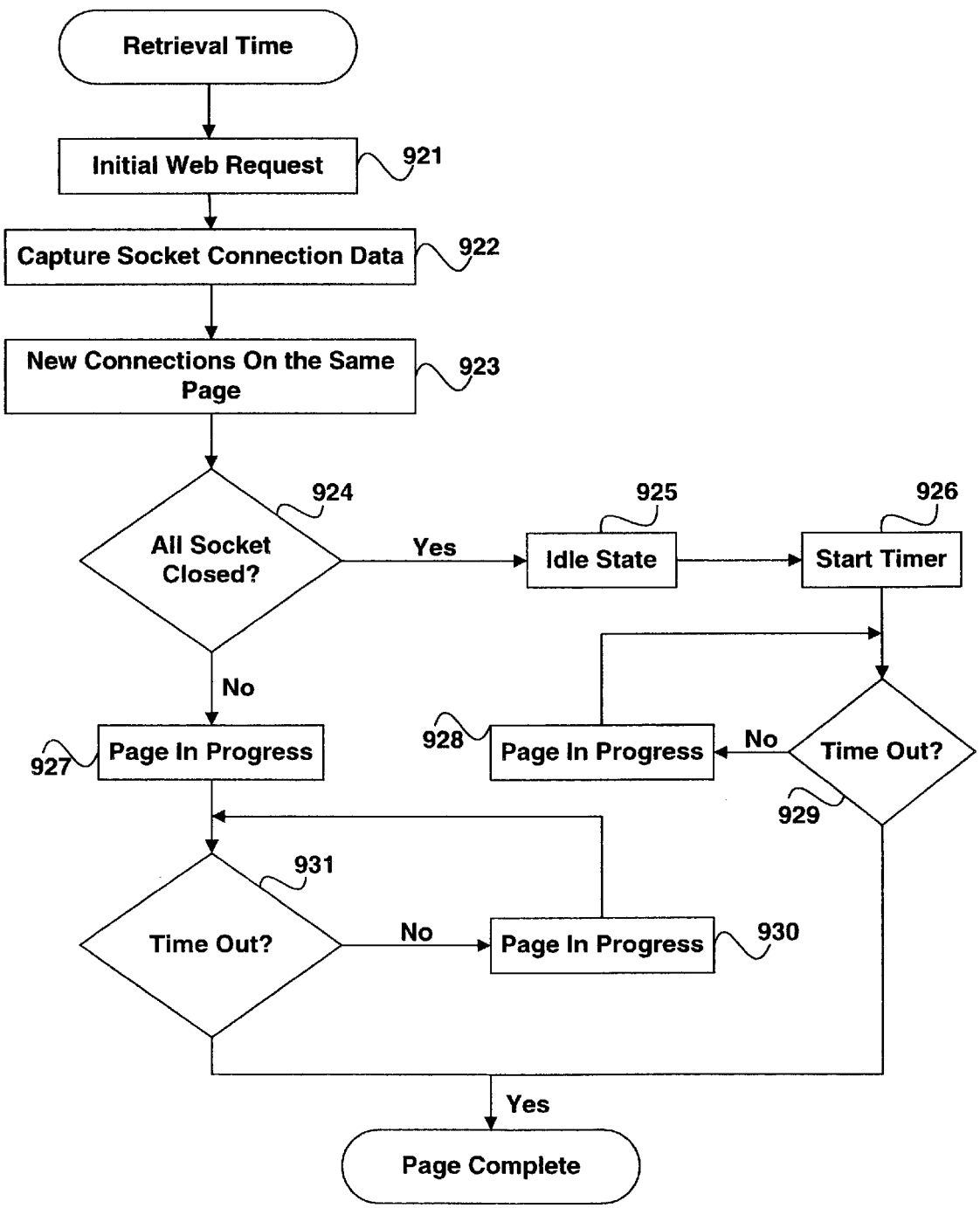
FIG. 9(B) is a flow diagram illustrating a method of determining retrieval time such as may be utilized by the present invention.

Turning now to FIG. 9(B), page retrieval time is computed. An initial web request is made, block 921 and captured by the socket analyzer, block 922. The socket analyzer maintains a table of connections, storing for each connection which stores the socket, the IP address and the port and the time of the request. The IP address provides server and proxy information,. The port provides information on the requested 'service, e.g., HTTP, email, etc. If the request is for a new connection on the same page, the table entry is simply updated, block 923. The socket analyzer then determines the page retrieval time by measuring the time difference between when the request is made and when the page is received. If the socket is closed, block 924, socket analyzer enters an idle state briefly, block 925 and then starts a timer block 926. The timer used to allow time outs and retries of page retrievals as will be described in greater detail in connection with FIG. 10. The socket analyzer waits while the page is in progress, block 928, until either the page completes or a time out occurs. If the page completes, the retrieval time is recorded and displayed on the display of FIG. 2. If a time out occurs, the method of FIG. 10 may be utilized. Similarly, if the socket is not closed, a check is made if the page is in progress, block 927 and the page is monitored, block 930, until the page is retrieved or a time out occurs.

Figure 10:
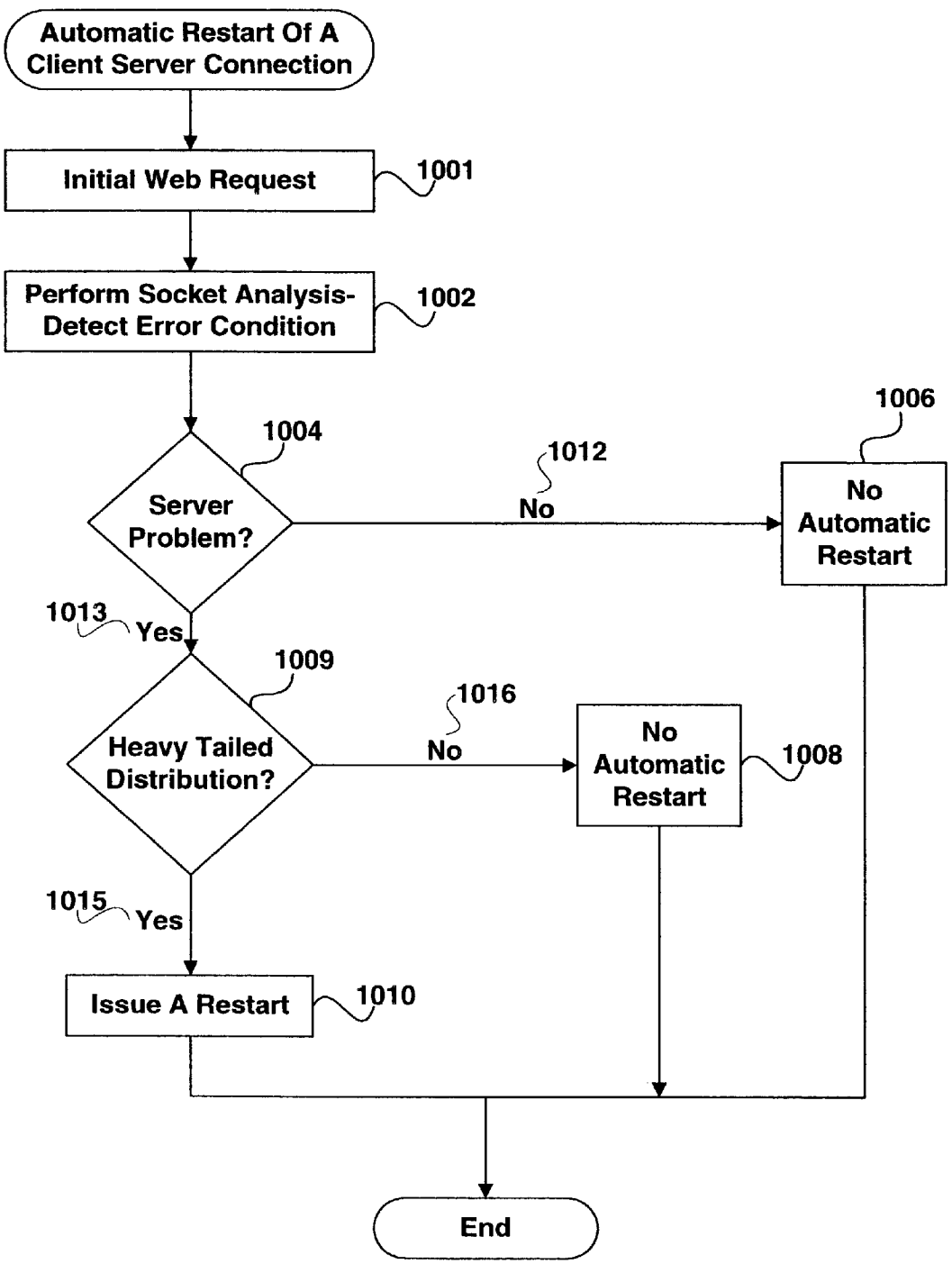
FIG. 10 illustrates a method of restarting a connection such as may be utilized by the present invention.

X. Automatic Restart of Connections (FIG. 10)

Certain error conditions can, and often do, occur in retrieval of web pages on the internet. Some of these can be explained by known error conditions. Other times, the system simply seems to hang, taking an unusually long period of time to return a requested page. It has been observed that when a web connection takes more than a predetermined length of time before returning a requested web page, it will probably take even longer before completion. In other words, just because a user has been in the queue for a period of time does not necessarily imply that the user is moving toward the top of the queue. Rather, quite the opposite seems to be the case. After waiting a long period of time, it is generally faster for the user to simply stop the web browser and restart the page request. Having observed this phenomenon, the present invention developed a method for automatic restart of web page requests.

Initially, a user requests a web page, block 1001. Socket analysis is performed by the present invention as is discussed in connection with FIG. 9(A). The socket analysis process detects the various error conditions which may occur. One error condition which is noted by the socket analysis process is that the retrieval time has exceeded a predetermined time (for example, 1 minute). In the event of an error condition, a test is first performed to determine if the error is due to a server problem (e.g., the server specified does not exist), block 1004. If the error condition is not due to a server problem, branch 1012, no automatic restart is performed, block 1006.

If the error condition is due to a server problem, branch 1013, a check is made to determine if the problem is due to what will be termed a "heavy tailed distribution". This is because it is observed that in certain instances, a restart will not cure the problem and no automatic restart is performed, block 1008. In particular, a check is made to determine if the HTTP time is greater than a threshold and whether the network is generally congested. If there is a heavy tailed distribution, a browser restart command is issued, block 1010.

Xl. Summary (FIG. 11)

Figure 11:
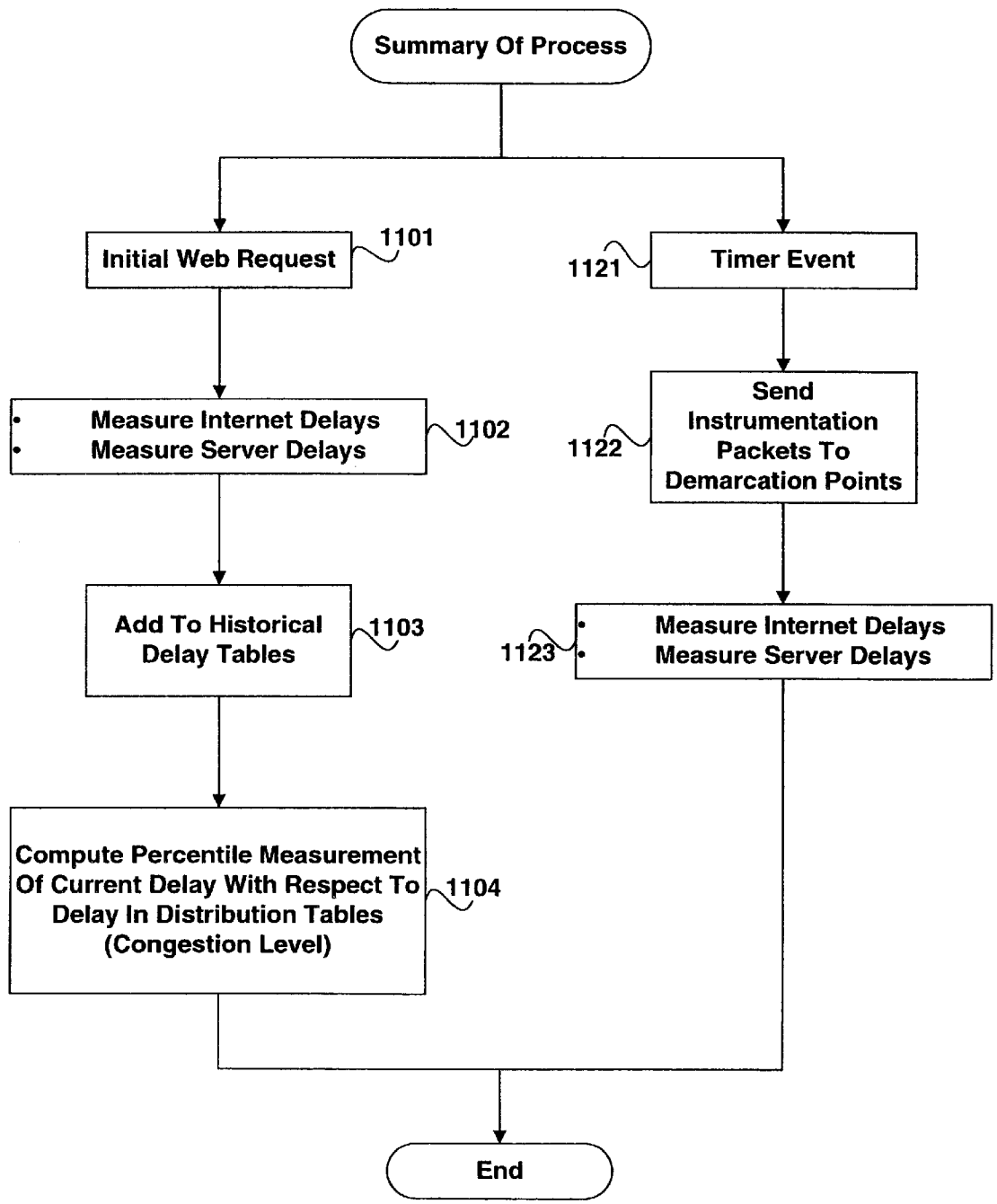
FIG. 11 illustrates an overall summary of portions of the visualization process of the present invention.

FIG. 11 is useful for providing a summary of use of some of the methods that have been described. Information is gathered in two modes in the present invention.

First, certain information is gathered periodically regardless of user activity, block 1121. This would include, for example, measuring internet and server delays for current path. In this mode, initially, demarcation points in the path are determined as was described in connection with FIG. 5. Then, periodically based on time, instrumentation packets are transmitted to the various demarcation points in the path, block 1122. For example, in the path of Table I, instrumentation packets may be sent to the IXA service provider domain, to the MCI service provider domain, to the ISI service provider domain and to the vitalsigns server. The instrumentation packets are of the type which has been previously described and provide for determining throughput, bottlenecks, utilization, etc. The internet and server delays are measured, block 1123, and updated on the display of FIG. 2.

Other information is gathered in a second mode, based on user activity. For each web request, block 1101, the internet and server delays are measured 1102 as has been described. This information is added to historical tables, block 1103. Current delay can then be measured against historical measurements to determine congestion level, block 1104.

XII. Inlay Insertion (FIG. 12)

Figure 12A:
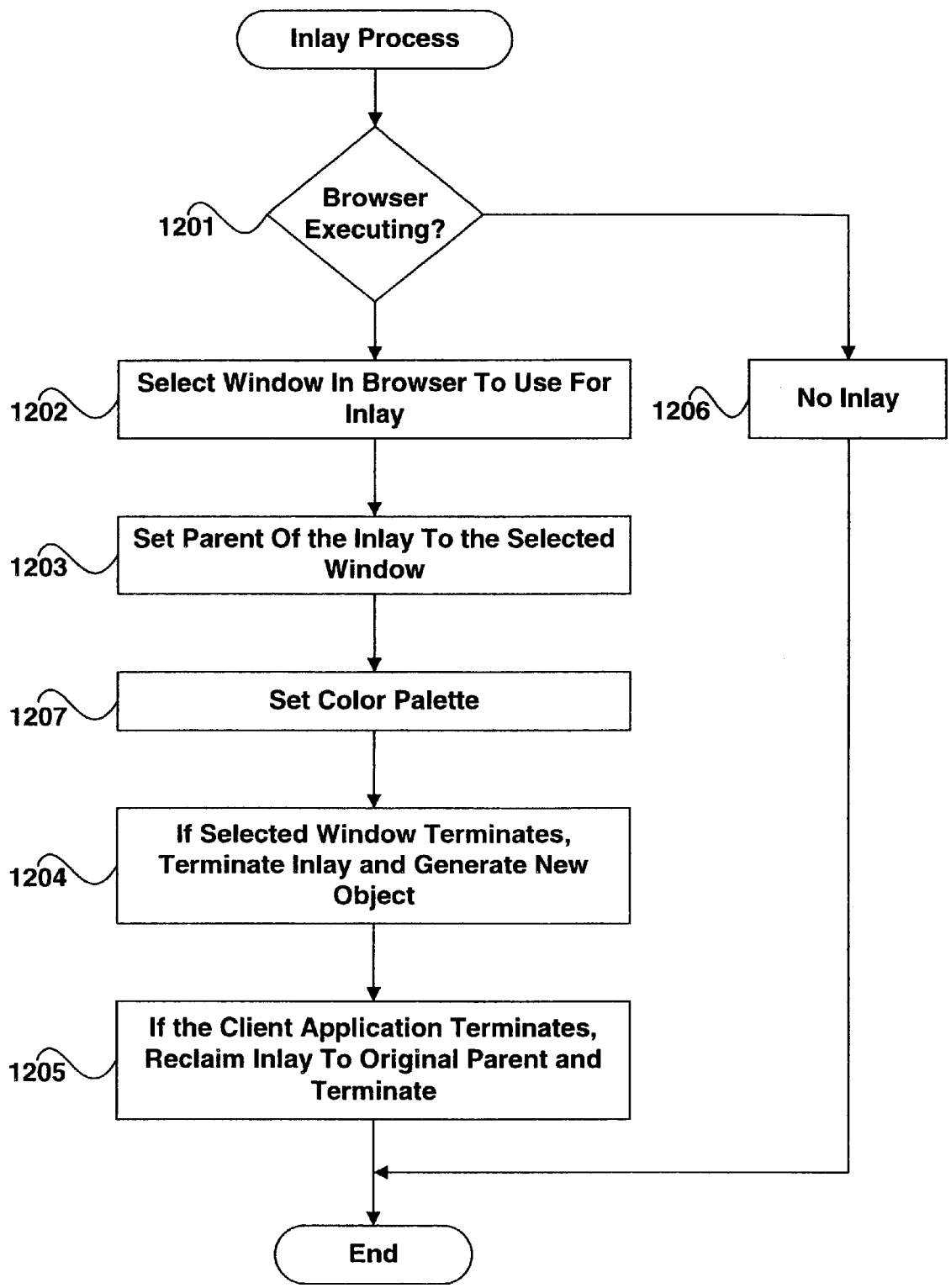
FIGS. 12(A) and 12(B) illustrates a method of inserting inlays as may be utilized by the present invention.

FIG. 12(A) provides an overview of a method for inserting inlays in an application, such as a browser. Although the discussion below will focus on inlays in a browser because the described embodiment is useful for monitoring communication over a network such as may occur while using a browser, it will be apparent that the described method for creating an inlay may be utilized to create inlays in other application program interfaces.

Referring back to FIG. 2(A), a user may select a pane such as panes 202–208 from the interface 201 to inlay in a browser. The pane is inlayed as is illustrated by FIG. 2(B) which illustrates inlay 223 in browser 221.

Figure 12B:
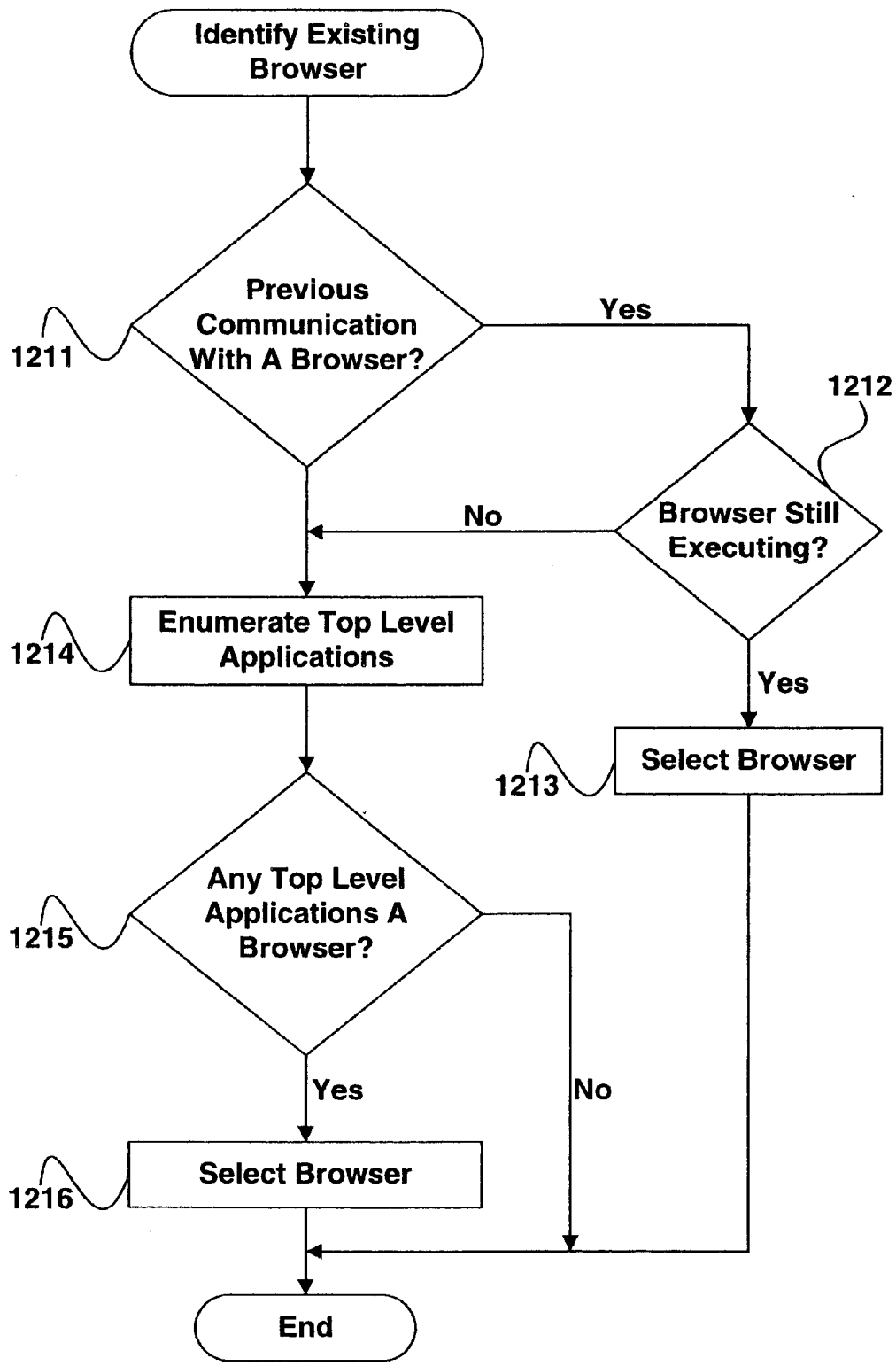

Initially, a determination is made whether a browser is executing on the computer system, block 1201. Of course, in other embodiments which concern themselves with inlays in other applications, a determination would be made if such other application was executing. One method of determining if a browser is executing is illustrated by FIG. 12(B) which will be described in greater detail below.

In any event, if a browser is executing, a window within the browser is selected for the inlay, block 1202. In the described embodiment, the toolbar window of the browser is typically selected. Dependent on the particular browser which is selected, the toolbar window may be identified based on a class of window, based on the name of the window or based on the size of the window.

Once the toolbar window is selected, it is set as the parent of the inlay, block 1203. In the described embodiment, this is done by executing the SetParent function of the application program interface (API). The SetParent function specifies the handle of the inlay and the handle of the toolbar window and returns the handle of the previous window (i.e., of the original client application). If the function fails, the returned value is NULL.

Typically, the operating system will allow a new application to install its own color palette as the color palette for the system. It has been found if the inlay is allowed to install it's color palette as the color palette for the system that certain system abnormalities occur. Therefore, in the described embodiment, the color palette for the browser is used by indicating that the inlay's color palette is not to be used as the primary color palette, block 1207.

If the selected window (e.g., the toolbar) is destroyed, the inlay is also destroyed and its original parent is notified by the operating system. The original parent then generates a new object of the inlay, block 1204. The selected window may terminate as a result of the browser being terminated by the user, or as a result of some other abnormal termination. If the window itself is closed by the user, the inlay is hidden together with the window and is not terminated.

Similarly, if the original parent application (e.g., interface 201) terminates, it first reclaims the inlay by setting the parent back to itself and then terminates the inlay, block 1205.

The user may also execute an unsnap operation to allow the inlay to be returned to its original parent.

If there was no browser executing, no inlay function is performed, block 1206.

Turning now to selection of a browser and to FIG. 12(B), web browsers enabled for client applications (CA) support one way communication with the client application for socket layer activities. When a socket layer activity occurs, the browser identifies itself to the client application. If a browser was previously in communication with the client application, block 1211, a determination is made whether the browser is still executing, block 1212. If it is, that browser is selected as the browser for the inlay, block 1213.

If there was no previous communication with a browser, or if that browser has terminated, a call is made to the API to obtain a list of all top level applications executing on the computer, block 1214. A determination is then made if any of the top level applications are browsers which are supported for the inlay function, block 1215. If a supported browser is found, it is selected as the browser for the inlay, block 1216. If not, no browser is selected, block 1217, and in accordance with FIG. 12(A), no inlay is made.

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

What is claimed is:

1. A method of inserting an inlay into an application interface of a second application, the inlay comprising a portion of an application interface of a first application, the method comprising the steps of:

determining if the second application is executing and, if so;

validating whether the second application is a supported application and, if so;

setting the application interface of the second application as the parent of the inlay; and selecting a window in the application interface of the second application for the inlay;

wherein the window is selected based on a parameter selected from the group consisting of a class of the window, a name of the window, and a size of the windowland; and whereby information generated by the first application is visually presented to a user during execution of the second application.

2. A method of inserting an inlay into an application interface of a second application, the inlay comprising a portion of an application interface of a first application, the method comprising the steps of:

determining if the second application is executing and, if so;

validating whether the second application is a supported application and, if so;

setting the application interface of the second application as the parent of the inlay;

wherein the step of determining if a second application is executing comprises the step of identifying an existing browser; and wherein the step of identifying an existing browser comprises the steps of:

identifying a browser with which the first application has previously communicated;

determining if the identified browser is still executing and, if so, selecting the identified browser as the existing browser;

if the identified browser is not still executing, or if no browser exists with which the first application has previously communicated, examining a list of top-level applications currently executing, determining if any of the currently executing top-level applications is a browser, and, if so, selecting the browser as the existing browser; and whereby information generated by the first application is visually presented to a user during execution of the second application.

3. In a computer-implemented user interface having an inlay displayed on the interface in a first application, a method of displaying the inlay in a second application comprising the steps of:
- selecting the second application and determining whether the second application is executing;
- selecting a window in the second application for display of the inlay; and
- setting the parent of the inlay to the selected window;
- wherein the step of selecting the second application comprises selecting an existing browser; and
- wherein the existing browser is selected by the steps of:
  - identifying a browser with which the first application has previously communicated;
  - determining if the identified browser is still executing and, if so, selecting the identified browser as the existing browser;
  - if the identified browser is not still executing, or if no browser exists with which the first application has previously communicated, examining a list of top-level applications currently executing, determining if any of the currently executing top-level applications is a browser, and, if so, selecting the browser as the existing browser; and
  - whereby information generated by the first application is visually presented to a user during execution of the second application.

4. In a computer-implemented user interface having an inlay displayed on the interface in a first application, a method of displaying the inlay in a second application comprising the steps of:
- selecting the second application and determining whether the second application is executing;
- selecting a window in the second application for display of the inlay; and
- setting the parent of the inlay to the selected window;
- wherein the window is selected based on a parameter selected from the group consisting of a class of the window, a name of the window, and a size of the window; and
- whereby information generated by the first application is visually presented to a user during execution of the second application.

5. In a computer-implemented user interface, a method of displaying an inlay from a first application in an application interface of a second application comprising the steps of:
- a) determining whether the second application is executing;
- b) selecting a window in the second application for display of the inlay; and
- c) setting the parent of the inlay to the selected window with initiation by the first application;
- wherein the inlay comprises a portion of an application interface from the first application, the portion being a subset of the application interface from the first application and being a graphical depiction of a quantifiable network connection parameter; and
- whereby information generated by the first application is visually presented to a user during execution of the second application; and
- wherein the selected window is the toolbar window.

* * * * *